(No Model.)

J. GILL.
DEVICE FOR OPERATING STEAM ENGINE INDICATORS.

No. 455,999. Patented July 14, 1891.

Witnesses:
G. G. Ames
John Gill

James Gill
Inventor
per F. Geisler
his Attorney.

UNITED STATES PATENT OFFICE.

JAMES GILL, OF PORTLAND, OREGON, ASSIGNOR OF ONE-HALF TO JOHN GILL, OF SAME PLACE.

DEVICE FOR OPERATING STEAM-ENGINE INDICATORS.

SPECIFICATION forming part of Letters Patent No. 455,999, dated July 14, 1891.

Application filed December 3, 1890. Serial No. 373,497. (No model.)

*To all whom it may concern:*

Be it known that I, JAMES GILL, a citizen of the United States, residing at Portland, Multnomah county, and State of Oregon, have invented a new and useful Device for Operating Steam-Engine Indicators, of which the following is a specification, reference being had to the accompanying drawings, forming a part thereof.

The devices heretofore used for this purpose are more or less complicated and not conveniently applied and detached, and are, moreover, liable to become inaccurate with usage. These obstacles I overcome by the mechanism I have invented, which is illustrated in said drawings.

Figure 1:
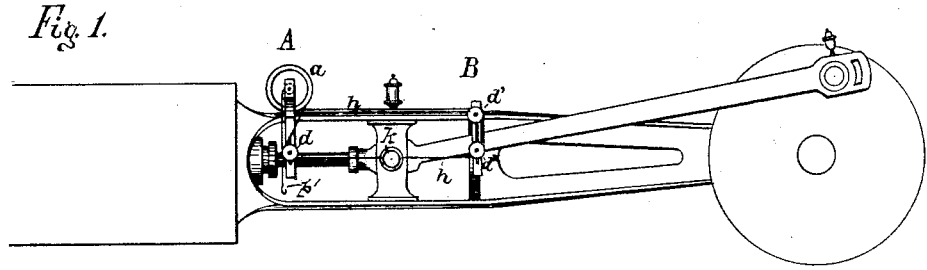
Figure 2:
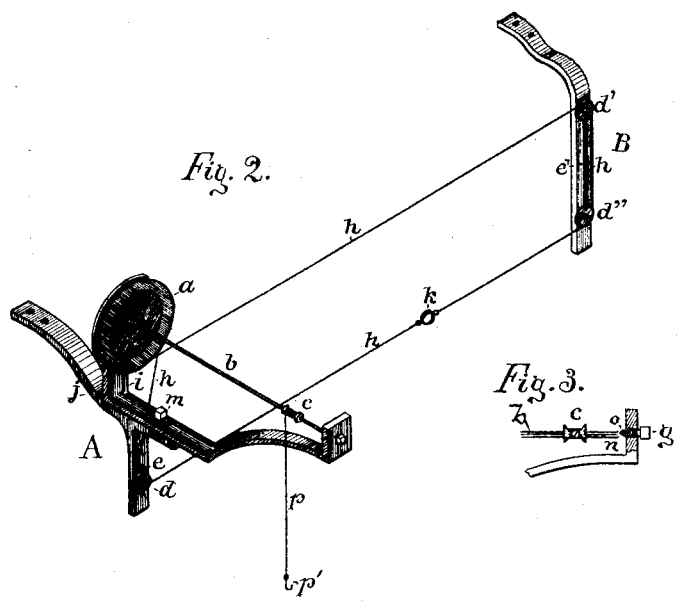
Figure 3:
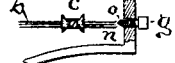

Figure 1 is a side elevation of a portion of an engine with my invention attached. Fig. 2 is a perspective view of the device invented by me, and Fig. 3 is a partial view showing an end of the shaft $b$ and bracket A.

Like letters refer to like parts.

The larger flanged wheel or pulley $a$ carries on its axis, the horizontal shaft $b$, a smaller pulley $c$, proportioned in its relative size with the wheel $a$ as the distance traveled by the piston to the length of the motion of the paper-drum of the indicator. Both pulleys are adjustable laterally to and from each other, and fixed when in position by means of set-screws, which may be inserted in the hub of the wheel and through the body of the pulley $c$. The shaft $b$ is carried in the upper section $i$ of the bracket A, such upper section being horizontally adjustable on the lower section $j$, and secured in place when in position by a set-screw. The lower section $j$ of said adjustable bracket A carries a small stud-pulley $d$, having a V-shaped working-face and vertically-adjustable in a slot $e$, the pin of the pulley protruding on the other side and being threaded to receive a nut for securing the stud in position.

The bracket B is provided with two stud-pulleys $d'$ $d''$, similar to the pulley $d$, and also vertically adjustable in the slot $e'$. Both brackets are attached to some suitable part of the engine over the cross-head, as shown in Fig. 1. The shaft $b$ is hung on centers to lessen the friction on the ends thereof, as illustrated in Fig. 3, being provided with countersunk cavities $n$, in which bear the pointed ends $o$ of screws $g$. The brackets A B being in position, an operating-cord $h$ is passed over the wheel $a$, one end of such cord passing over the wheel, then dropped to the pulley $d$, and thence led horizontally to the engaging-ring $k$, and the other end passing under the wheel, then conducted horizontally to the pulley $d'$, dropped to the pulley $d''$, and finally led back horizontally to the engaging-ring $k$, which is connected with the cross-head of the engine.

It is essential that the cord operating my invention run parallel with the engine cross-head. The smaller pulley $c$ on the shaft $b$ has a line $p$ and hook $p'$ for connecting the same with the indicator.

The engaging-ring $k$ may be conveniently constructed of a piece of wire bent in the form of a spiral—about three turns—and provided with an eye on each end to attach the operating-cord to.

By means of the mechanism described I operate the steam-engine indicator by direct positive power, avoiding loss of motion and causing the motion communicated to the indicator to be perfectly coincident with that of the piston, thus enabling an accurate estimate of the power of the engine to be made.

Now what I claim as my invention, and desire to secure by Letters Patent of the United States, is—

1. A device for operating a steam-engine indicator, consisting of a flanged wheel or pulley carrying on its axis a smaller pulley relatively proportioned, from which is run an operating-line to the indicator, the wheel being operated by a cord running on the same, the ends of which, after crossing each other at an angle, are led over a series of pulleys, so as to run parallel with the engine cross-head with which it is connected and suitable supports therefor, all as and for the purposes set forth.

2. In a device for operating a steam-engine indicator, a flanged wheel or pulley carrying on its axis a smaller pulley relatively proportioned, from which is run an operating-line to the indicator, the wheel being operated by a cord running on the same, the ends of which, after crossing each other at an angle, are led over a series of pulleys $d$ $d'$ $d''$, vertically adjustable, so as to run parallel with the engine cross-head, suitable means for connecting such cord with the cross-head, and suitable supports for holding the mechanism and attaching the same to the engine, the parts being combined substantially as set forth.

3. In a device for operating a steam-engine indicator, a flanged wheel or pulley carrying on its shaft a smaller pulley relatively proportioned, from which is run an operating-line to the indicator, the wheel and pulley being laterally adjustable to and from each other, the wheel operated by a cord running on the same, the ends of which, after crossing each other at an angle, are led over a series of pulleys so as to run parallel with the engine cross-head with which it is connected, and suitable supports for the mechanism, the parts being combined substantially as described.

4. The combination of the bracket A, the shaft $b$, carrying the wheel $a$, and pulley $c$, hung on centers in the upper section $i$, horizontally adjustable on the lower section $j$, provided with an adjustable stud-pulley $d$, substantially as and for the purposes set forth.

5. In a device for operating a steam-engine indicator, the combination of the bracket A, consisting of an upper and lower section $i$ $j$, the former being adjustable on the latter and containing the shaft $b$, hung on centers therein carrying the adjustable wheel $a$ and adjustable pulley $c$, from which an operating-line $p$ is run to the indicator, the adjustable pulley $d$, the bracket B, provided with adjustable pulleys $d'$ $d''$, and the operating-cord $h$, provided with an engaging-ring $k$, all as and for the purposes set forth.

Dated Portland, Oregon, November 4, 1890.

JAMES GILL.

Witnesses:
M. D. MACDONALD,
T. J. GEISLER.